W. S. SIMS.
Tobacco Pouch.
No. 2,561. Reissued April 16, 1867.
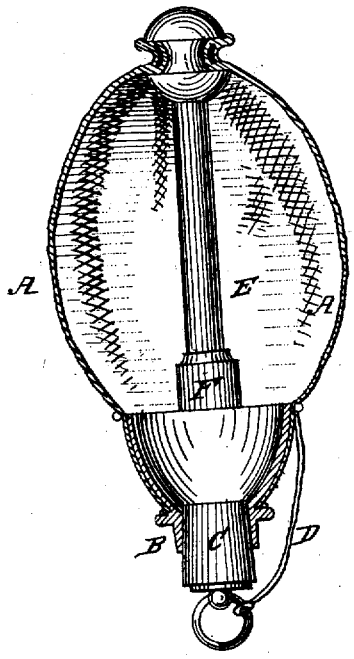
Witnesses
W. A. Jackson
J. A. Service
Inventor
W. S. Sims
Per Munn & Co.
Attorneys

UNITED STATES PATENT OFFICE.

WINFIELD S. SIMS, OF NEWARK, NEW JERSEY.

IMPROVEMENT IN TOBACCO-POUCHES.

Specification forming part of Letters Patent No. 62,448, dated February 26, 1867; Reissue No. 2,561, dated April 16, 1867.

*To all whom it may concern:*

Be it known that I, WINFIELD S. SIMS, of Newark, in the county of Essex and State of New Jersey, have invented a new and Improved Tobacco-Pouch; and I do hereby declare that the following is a full, clear, and exact description thereof, which will enable those skilled in the art to make and use the same, reference being had to the accompanying drawing forming part of this specification.

The present invention consists in combining with a tobacco-pouch a device by means of which a pipe can be charged with the tobacco contained in the same, the combination of the two being such that while they will each serve their purpose or object independently of the other they form only one article.

In the accompanying plate of drawings my improved tobacco-pouch is illustrated, the figure being a central section through the same in the direction of its length.

A in the drawing represents the tobacco-pouch, which in the present instance is made of leather, but may be made of any other material ordinarily used therefor, such as india-rubber, cloth, &c. B is the nozzle or spout for filling the pouch with tobacco or discharging it therefrom. It is tied or otherwise secured to the pouch in any convenient way. This nozzle I prefer to make so that it be somewhat of funnel shape, as shown in the drawing, its larger end being farthest within the pouch, this not only affording greater facility for the reception and discharging of the tobacco, but also insuring greater certainty of the proper action of the rod or rammer E, hereinafter mentioned, the flaring or inclined sides of this nozzle affording a certain guide to direct the end of the rammer into the mouth of the nozzle. I prefer, also, to place near the outer end of the nozzle a rim or flange, which may afford a convenient means for tying or otherwise securing the pouch to the nozzle whatever may be the size of the nozzle. The spout may be stopped or closed by means of a stopper, C, hung to the bag or pouch by a string, D. E is a rod secured in the lower end of bag or pouch A in any proper manner, so that it will not become detached therefrom, and which extends into the pouch for a portion of its length, and is provided with a head, F, upon its inner end, of suitable shape and size to play or move nicely through the nozzle or spout of the pouch when the stopper has been removed therefrom. By this headed rod E or rammer a pipe, C, can be filled with tobacco from the pouch in a most easy and expeditious manner by simply setting the pouch by its nozzle or spout upon the bowl of the pipe, allowing the tobacco to pass into it, when, bringing the rod E to bear against it, it can be "rammed" or forced or pressed down into the bowl to any degree desired, care being taken that the rammer is retained in the spout of the pouch before removing it from the pipe-bowl, or otherwise tobacco may escape from the pouch.

In conclusion, it may be here observed that for convenience in charging a pipe with tobacco my improved pouch is of a great advantage, as it enables it to be done without danger of soiling the hands or clothes, &c.

I claim as new and desire to secure by Letters Patent—

1. The tobacco-pouch A, formed with two openings, one for the reception of the nozzle and the other for the reception of the rod or rammer, as described.

2. The combination of the pouch A with the nozzle B.

3. The combination of the pouch A, nozzle B, rod E, substantially as and for the purpose described.

WINFIELD S. SIMS.

Witnesses:

P. E. WILSON,

N. W. HEILBURN.